(12) United States Patent
Yeh et al.

(10) Patent No.: US 9,426,393 B2
(45) Date of Patent: Aug. 23, 2016

(54) NOISE SIMULATION FLOW FOR LOW NOISE CMOS IMAGE SENSOR DESIGN

(71) Applicant: Taiwan Semiconductor Manufacturing Co., Ltd., Hsin-Chu (TW)

(72) Inventors: Shang-Fu Yeh, Hsin Chu (TW); Kuo-Yu Chou, Hsinchu (TW); Yi-Che Chen, Taichung (TW); Wei Lun Tao, Hsinchu (TW); Honyih Tu, Hsinchu (TW); Calvin Yi-Ping Chao, Zhubei (TW); Fu-Lung Hsueh, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 303 days.

(21) Appl. No.: 14/177,241

(22) Filed: Feb. 11, 2014

(65) Prior Publication Data

US 2015/0116506 A1    Apr. 30, 2015

Related U.S. Application Data

(60) Provisional application No. 61/897,904, filed on Oct. 31, 2013.

(51) Int. Cl.
| | |
|---|---|
| H04N 17/00 | (2006.01) |
| H04N 5/357 | (2011.01) |
| H04N 5/363 | (2011.01) |
| H04N 5/378 | (2011.01) |

(52) U.S. Cl.
CPC ............ *H04N 5/3575* (2013.01); *H04N 5/363* (2013.01); *H04N 5/378* (2013.01); *H04N 17/002* (2013.01)

(58) Field of Classification Search
CPC ..... H04N 5/3575; H04N 5/363; H04N 5/378
USPC ....... 348/241, 308, 607, 294, 301, 300, 320, 348/322, 533, 537; 341/122; 250/208.1
See application file for complete search history.

(56) References Cited

U.S. PATENT DOCUMENTS

| | | | |
|---|---|---|---|
| 7,847,846 B1* | 12/2010 | Ignjatovic ............ | H04N 5/3745 250/208.1 |
| 8,422,819 B2* | 4/2013 | Ise ....................... | H04N 5/3658 348/615 |
| 2010/0110248 A1* | 5/2010 | Chou ..................... | H04N 5/378 348/300 |

OTHER PUBLICATIONS

Murmann, B., "Thermal Noise in Track-and-Hold Circuits", IEEE Solid-State Circuits Magazine, Spring 2012, pp. 46-54.
Kundert, K., "Simulating Switched-Capacitor Filters with SpectreRF", The Designers Guide Community, 2006, 25 pages.

* cited by examiner

*Primary Examiner* — Paulos M Natnael
*Assistant Examiner* — Jean W Desir
(74) *Attorney, Agent, or Firm* — Duane Morris LLP (57) ABSTRACT

A method for noise simulation of a CMOS image sensor comprises performing a frequency domain noise simulation for a readout circuit of the CMOS image sensor using a computer, wherein the readout circuit includes a correlated double sampling (CDS) circuit, wherein the frequency domain noise simulation includes a CDS transfer function to refer a noise introduced by the CDS circuit back to an input node of the readout circuit. The method further comprises calculating noise at the input node of the readout circuit based on the referred back noises caused by one or more components in the readout circuit and estimating noise of the CMOS imaging sensor by comparing the calculated noise at the input node of the readout circuit to an original input signal to the readout circuit of the CMOS imaging sensor.

20 Claims, 6 Drawing Sheets

NOISE SIMULATION FLOW FOR LOW NOISE CMOS IMAGE SENSOR DESIGN

PRIORITY CLAIM AND CROSS-REFERENCE

This application claims the benefit of U.S. Provisional Patent Application No. 61/897,904, filed Oct. 31, 2013, and entitled "A New AC Noise Simulation Flow with CDS Transfer Function for Designing Low Noise CMOS Image Sensor," and is hereby incorporated herein by reference.

BACKGROUND

This disclosure relates to complementary metal-oxide-semiconductor (CMOS) image sensors. A CMOS image sensor is a type of active pixel sensor made using the CMOS semiconductor process. Extra circuitry next to the sensor such as a readout circuit of the CMOS image sensor converts the light energy received to a voltage signal. Additional circuitry on the imaging sensor such as an analog-to-digital convertor (ADC) may be included to convert the voltage signal to digital data.

During the design of the CMOS image sensor, noise of the image sensor can be simulated either via time domain noise simulation or frequency domain noise simulation. The time domain noise simulation is the analysis of mathematical functions, physical signals or time series data of noise of the image sensor with respect to time. The frequency domain noise simulation refers to the analysis of mathematical functions of noise signals with respect to frequency, rather than time. The time-domain noise simulation shows how the noise of the image sensor changes over time, whereas the frequency-domain noise simulation shows how much of the noise lies within each given frequency band over a range of frequencies.

Some noise sources in the CMOS image sensor may be correlated since these noise sources come from sampling of the same data at different point in time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This disclosure describes a noise simulation flow for design of a low noise readout circuit for a CMOS image sensor within a reasonable simulation time. A correlated double sampling (CDS) transfer function is integrated into the simulation flow to enable frequency domain noise simulation of correlated noises due to operations of a CDS circuit in the readout circuit. As referred to hereinafter, the CDS circuit is a circuit in the readout circuit chain used to measure electrical values such as voltages or currents that allows removing an undesired offset from the output of the image sensor. In some embodiments, the CDS circuit measures the output of the sensor at least twice: once in a known condition and once in an unknown condition. The value measured from the known condition is then subtracted from the unknown condition to generate a value with a known relation to the electrical values being measured. Since the CDS circuit samples the same pixel twice at different points in time, the noises from the two sampling are correlated. The CDS transfer function (Hcds(f)) is a frequency domain function reflecting the input-output relation of the CDS circuit.

Figure 1A:
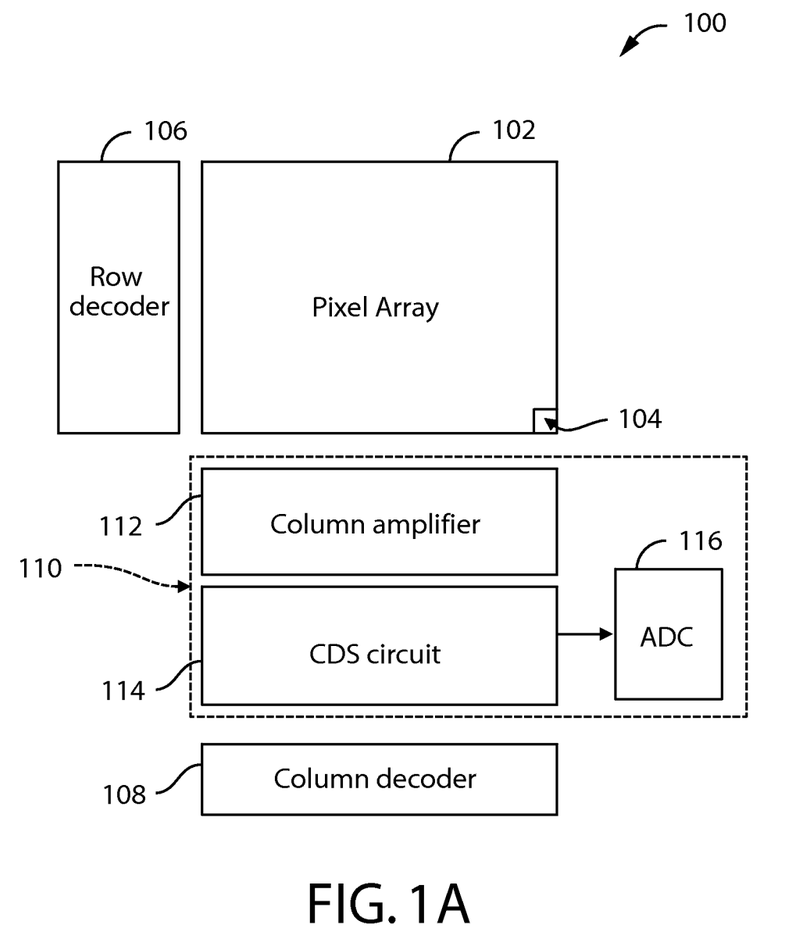
FIG. 1A shows schematic view of an example of a CMOS image sensor having a pixel array, a row decoder, a column decoder, and a readout circuit, in accordance with some embodiments.

FIG. 1A shows schematic view of an example of a CMOS image sensor 100 having a pixel array 102, a row decoder 106, a column decoder 108, and a readout circuit 110. As shown in FIG. 1A, the pixel array 102 includes a plurality of pixels 104 arranged in an array of rows and columns, wherein each of the pixels 104 may include one or more sensing elements (e.g., 2 green, 1 blue and 1 red) to collect and convert received light into an electric (e.g., voltage) signal. The row decoder 106 selects one row of the pixel array 102 according to a row address and the column decoder 108 selects one column of the pixel array 102 according to a column address. The readout circuit 110 receives, processes, and outputs the electrical signals from the pixels 104 in the pixel array 102 selected by the row decoder 106 and/or the column decoder 108.

As shown in FIG. 1A, the readout circuit 110 of the CMOS image sensor 100 further includes a column amplifier 112, a CDS circuit 114, and an ADC 116. The column amplifier 112 is used to amplify small voltage signals generated by the pixels 104 of the pixel array 102 before the voltage signals are processed by the CDS circuit 114. When used in the image sensor 100, the CDS circuit 114 samples each pixel 104 twice at different points in time and achieves noise reduction by removing a reference voltage of the pixel (after it is reset) from the signal voltage of the pixel at the end of each integration period. Following the noise reduction by the CDS circuit 114, the ADC 116 converts the analog electric signal (e.g., voltage) to a digital number that represents the signal's amplitude as output from the CMOS image sensor 100 for further signal processing.

Figure 1B:
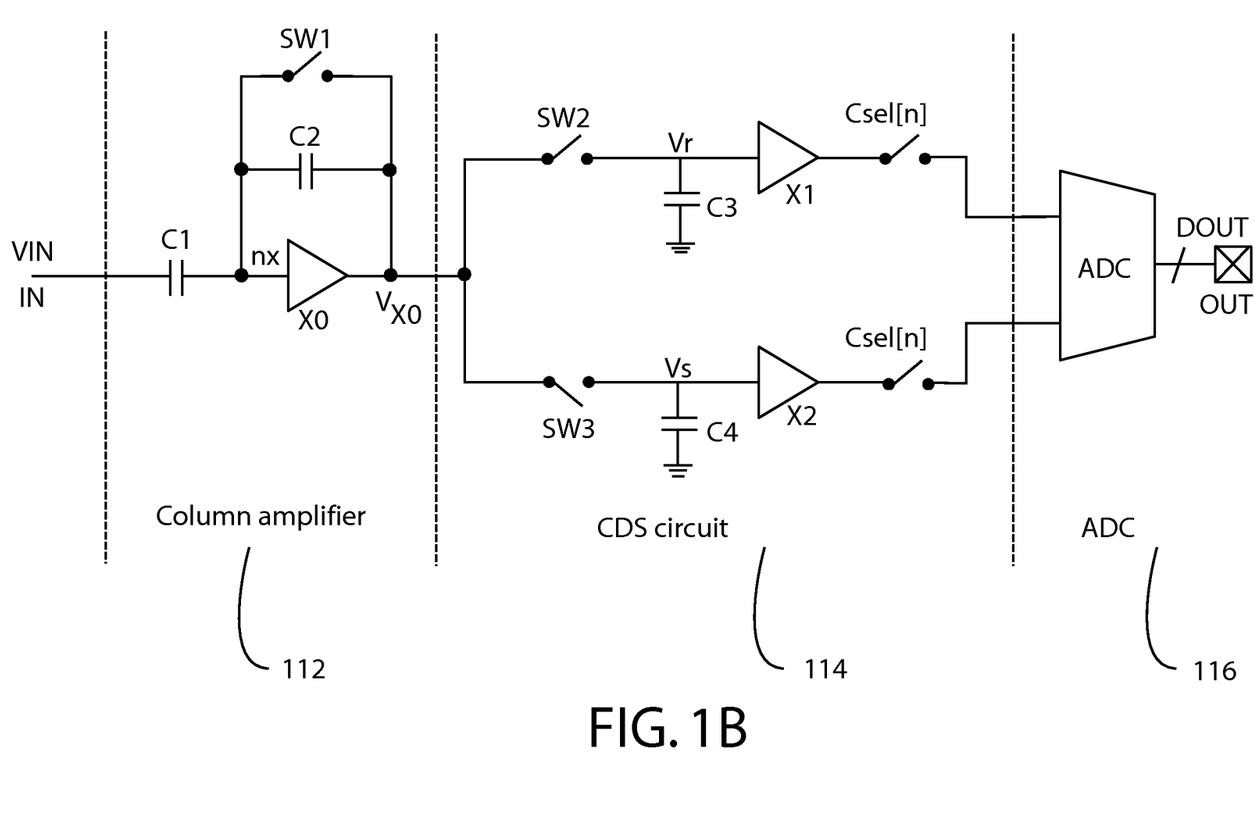
FIG. 1B shows an example of a circuit diagram for the column amplifier, the CDS circuit, and the ADC in the readout circuit of the CMOS image sensor shown in FIG. 1A, in accordance with some embodiments.

FIG. 1B shows an example of a circuit diagram for the column amplifier 112, the CDS circuit 114, and the ADC 116 in the readout circuit 110 of the CMOS image sensor 100. As shown by FIG. 1B, the voltage signal VIN at input node IN from the pixel 104 is first amplified by the column amplifier 112, then double sampled for noise reduction by the CDS circuit 114, and finally converted to digital signal DOUT at output node OUT by the ADC 116. During this process, either or both of the CDS circuit 114 and the ADC 116 may introduce additional noise to the original signal measured by the pixel 104. In order to measure and compensate for the noises introduced by the CDS circuit 114 and the ADC 116 correctly, the simulation flow of the readout circuit 110 of the CMOS image sensor 100 refers the output noise at the output node OUT back as an equivalent noise $V_{N,IN}$ at the input node IN so that it can be compared to the original input signal VIN for noise estimation. In the circuitry example of FIG. 1B, the simulation flow calculates $V_{N,IN}$ as:

$$\overline{V_{N,IN}^2} = \left(\frac{C_2}{C_1}\right)^2 \times \left(\overline{V_{N,CDS}^2} + \frac{kT}{C_3} + \frac{kT}{C_4} + \overline{V_{N,ADC}^2}\right)$$

Where $V_{N,CDS}$ and $V_{N,ADC}$ represent noises referred back to input node IN from the CDS circuit 114 and the ADC 116, respectively.

Since the CDS circuit 114 samples each pixel 104 twice at different points in time, CDS transfer function $H_{CDS}(f)$ reflecting the input-output relation of the CDS circuit 114 is utilized for the calculation of $V_{N,CDS}$ in the frequency domain according to the following equation:

$$\overline{V_{N,CDS}^2} = \int_0^\infty \overline{V_{N,V_{X0}}^2}(f) \times |H_{CDS}(f)|^2 df$$

where $V_{N,VX0}$ represents the noise at input node $V_{X0}$ to the CDS circuit 114 and $H_{CDS}(f)$ as a frequency domain function can be expressed as:

$$H_{CDS}(f) = 1 - e^{-j(2\pi f)T_0}$$

Figure 2:
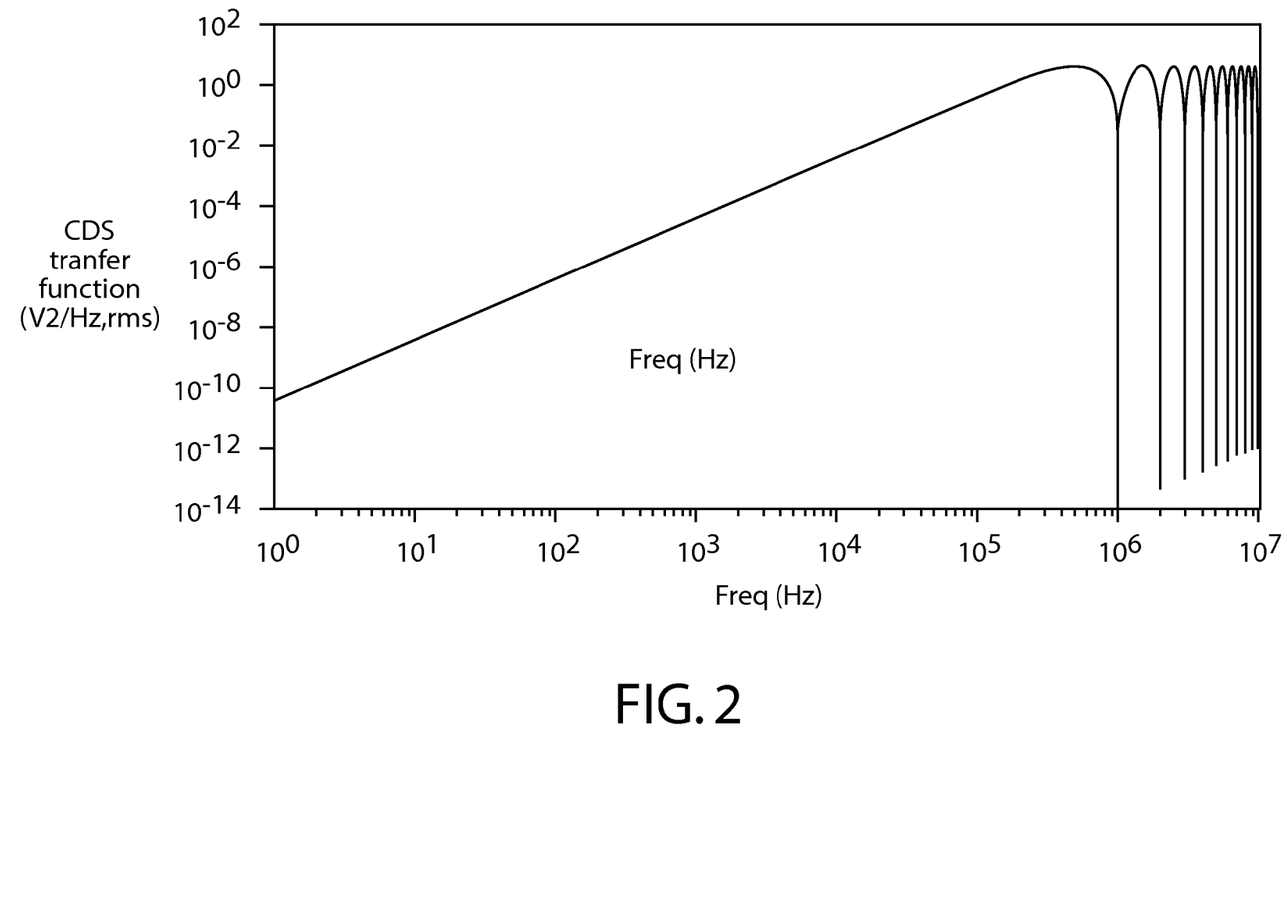
FIG. 2 an example of a CDS transfer function, in accordance with some embodiments.

FIG. 2 depicts $|H_{CDS}(f)|^2$ expressed above as a function of frequency f.

Figure 3A:
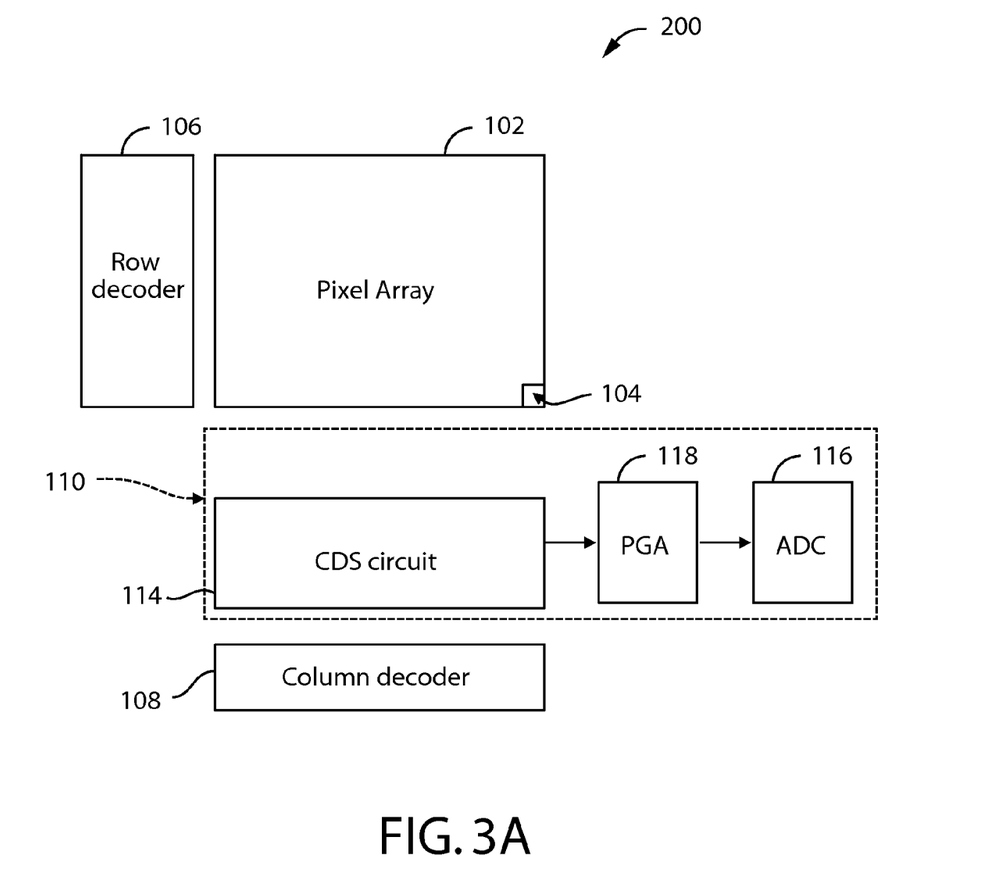
FIG. 3A shows schematic view of an example of a CMOS image sensor including a pixel array, a row decoder, a column decoder, and a readout circuit, in accordance with some embodiments.

FIG. 3A shows schematic view of an example of a CMOS image sensor 200 which, similar to the CMOS image sensor 100 shown in FIG. 1A, also includes a pixel array 102, a row decoder 106, a column decoder 108, and a readout circuit 110. These components can be the same as the like-numbered items discussed above, and for brevity their descriptions are not repeated. Unlike the CMOS image sensor 100 shown in FIG. 1A, however, the readout circuit 110 of the CMOS image sensor 200 includes a programmable gain amplifier (PGA) 118 in place of the column amplifier 114, wherein the PGA 118 is used to amplify the signal from pixel 104 with gain after the signal has been processed by the CDS circuit 114 instead of before the signal is processed by the CDS circuit 114. In some embodiments, the PGA 118 is an electronic amplifier, for a non-limiting example, an operational amplifier, whose gain can be controlled by one or more external digital or analog signals. In some embodiments, the gain of the PGA 118 can be set from less than 1V/V to over 100V/V. Following the signal amplification by the PGA 118, the ADC 116 converts the amplified analog electric signal (e.g., voltage) to a digital signal that represents the signal's amplitude as output from the CMOS image sensor 200 for further signal processing.

Figure 3B:
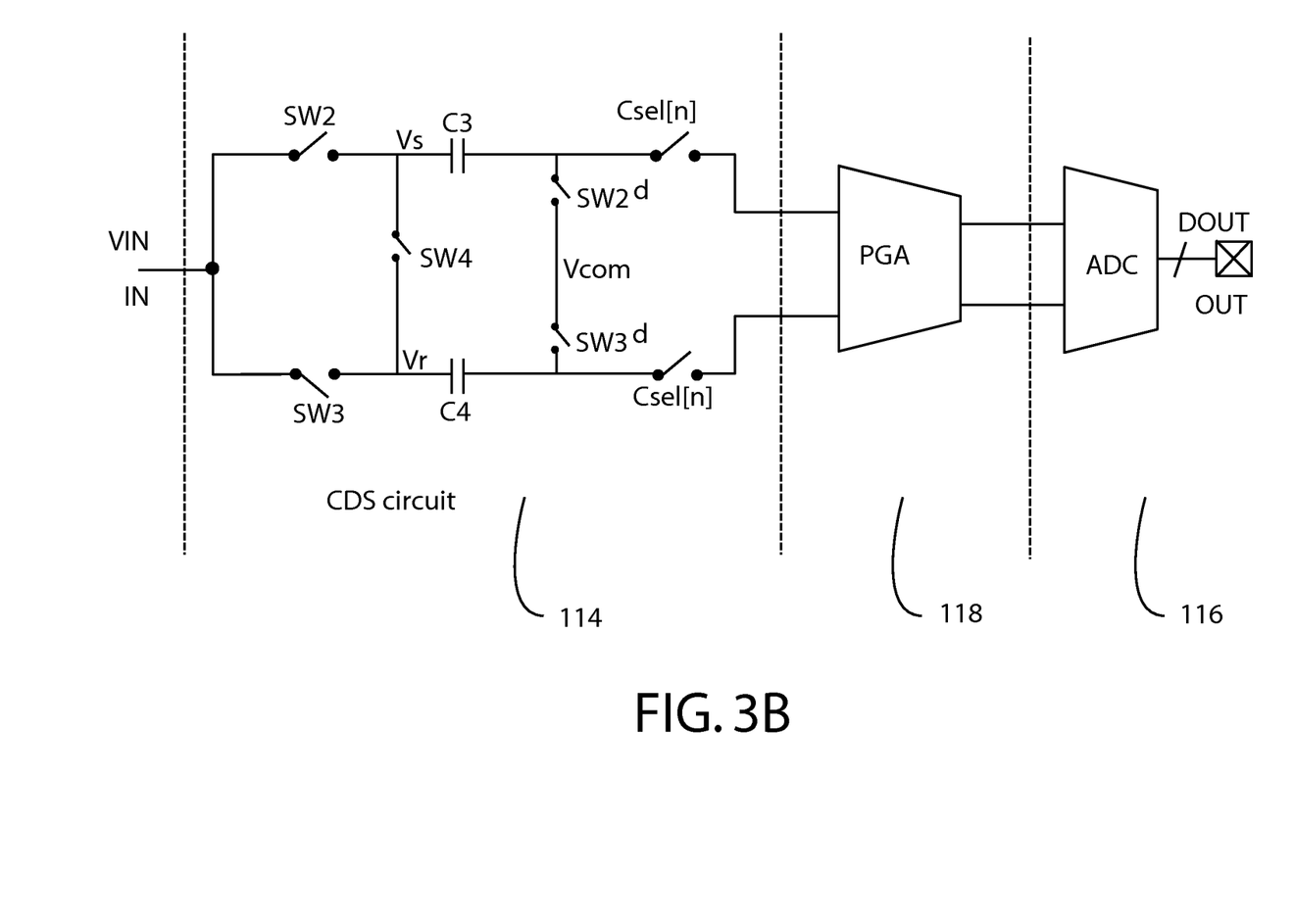
FIG. 3B shows an example of a circuit diagram for the CDS circuit, the PGA, and the ADC in the readout circuit of the CMOS image sensor shown in FIG. 3A, in accordance with some embodiments.

FIG. 3B shows an example of a circuit diagram for the CDS circuit 114, the PGA 118, and the ADC 116 in the readout circuit 110 of the CMOS image sensor 200. As shown by FIG. 3B, the voltage signal VIN at input node IN from the pixel 104 is first processed for noise reduction by the CDS circuit 114 before it is amplified by the PGA 118 and converted to digital signal DOUT at output node OUT by the ADC 116. During this process, all of the CDS circuit 114, the PGA 118, and the ADC 116 may introduce additional noise to the original signal measured by the pixel 104. Similar to the simulation flow for the CMOS image sensor 100, the simulation flow of the readout circuit 110 of the CMOS image sensor 200 refers the output noise at the output node OUT back to an equivalent noise $V_{N,IN}$ at the input node IN so that it can be compared to the original input signal VIN. In the specific circuitry example of FIG. 3B, the simulation flow calculates $V_{N,IN}$ as:

$$\overline{V_{N,IN}^2} = \overline{V_{N,CDS}^2} + \overline{V_{N,PGA}^2} + \overline{V_{N,ADC}^2}$$

where $V_{N,CDS}$, $V_{N,PGA}$, and $V_{N,ADC}$ represent noises referred back to input node IN from the CDS circuit 114, the PGA 118, and the ADC 116, respectively. The CDS transfer function $H_{CDS}(f)$ reflecting the input-output relation of the CDS circuit 114 is utilized for the calculation of $V_{N,CDS}$ in the frequency domain can be calculated according to the following equation:

$$\overline{V_{N,CDS}^2} = \int_0^\infty \overline{V_{N,IN}^2}(f) \times |H_{CDS}(f)|^2 df$$

where $H_{CDS}(f)$ is the same a frequency domain function as shown in FIG. 2 and discussed above.

Figure 4:
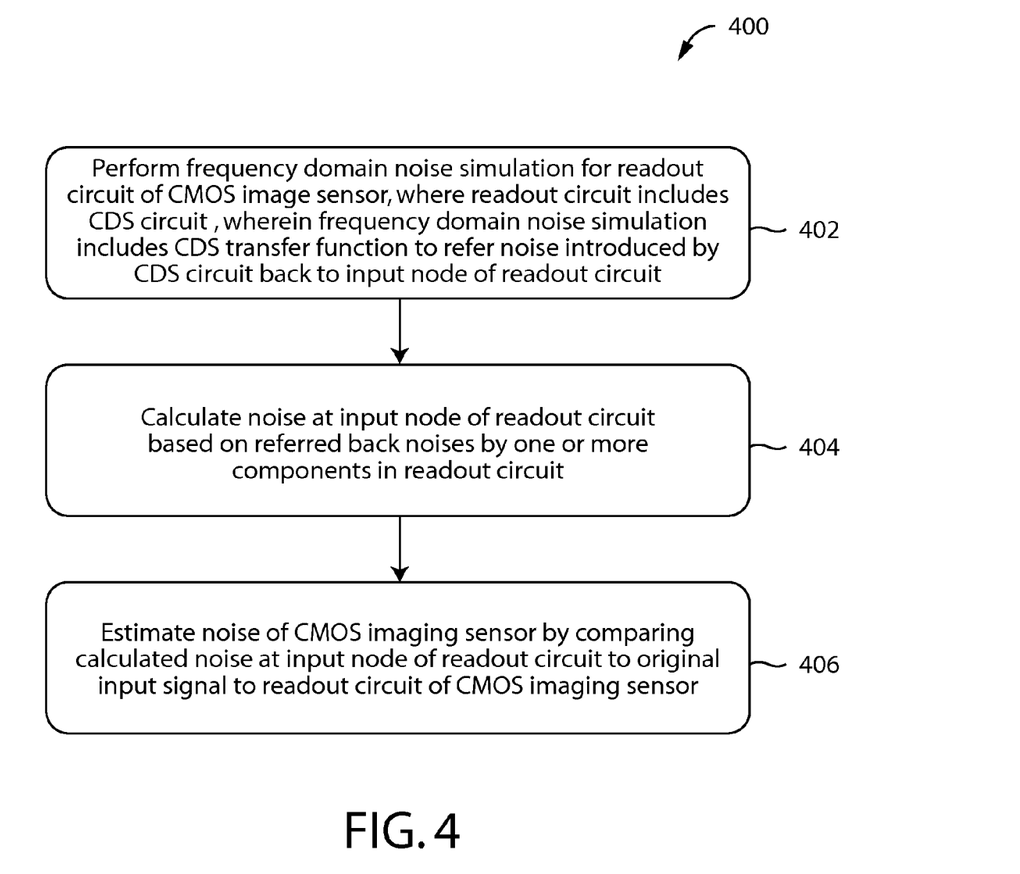
FIG. 4 is a flow chart of an example of a noise simulation flow for design of a low noise readout circuit for a CMOS image sensor, in accordance with some embodiments.

FIG. 4 is a flow chart 400 of an example of a noise simulation flow for design of a low noise readout circuit for a CMOS image sensor, wherein the noise simulation flow incorporates a CDS transfer function to enable frequency domain noise simulation of correlated noises due to the CDS circuit in the CMOS image sensor.

At step 402, a frequency domain noise simulation is performed for a readout circuit of a CMOS image sensor, wherein the readout circuit includes a CDS circuit, wherein the frequency domain noise simulation includes a CDS transfer function to refer a noise introduced by the CDS circuit back to an input node of the readout circuit.

At step 404, noise at the input node of the readout circuit is calculated based on the referred back noises by one or more components in the readout circuit.

At step 406, noise of the CMOS imaging sensor is estimated by comparing the calculated noise at the input node of the readout circuit to an original input signal to the readout circuit of the CMOS imaging sensor.

By integrating the CDS transfer function into the frequency domain noise simulation flow of the CMOS image sensor, the proposed approach is able to handle correlated noise sources caused by the operation of the CDS circuit of the readout circuit of the CMOS image sensor in the frequency domain. Since the simulation is performed in the frequency domain, it is much faster than the time domain noise simulation for the CMOS image sensor while maintaining high accuracy for the simulation result.

In some embodiments, a method for noise simulation of a CMOS image sensor comprises performing a frequency domain noise simulation for a readout circuit of the CMOS image sensor using a computer, wherein the readout circuit includes a correlated double sampling (CDS) circuit, wherein the frequency domain noise simulation includes a CDS transfer function to refer a noise introduced by the CDS circuit back to an input node of the readout circuit. The method further comprises calculating noise at the input node of the readout circuit based on the referred back noises caused by one or more components in the readout circuit and estimating noise of the CMOS imaging sensor by comparing the calculated noise at the input node of the readout circuit to an original input signal to the readout circuit of the CMOS imaging sensor.

In some embodiments, a system for performing noise simulation of a CMOS image sensor comprises a computing device programmed with executable instructions that, when executed, perform a frequency domain noise simulation for a readout circuit of the CMOS image sensor, wherein the readout circuit includes a correlated double sampling (CDS) circuit for noise reduction, the frequency domain noise simulation including a CDS transfer function in the frequency domain noise simulation to refer a noise introduced by the CDS circuit back to an input node of the readout circuit. The computing device is further programmed with executable instructions that, when executed, calculate noise at the input node of the readout circuit based on the referred back noises caused by one or more components in the readout circuit, and estimate noise of the CMOS imaging sensor by comparing the calculated noise at the input node of the readout circuit to an original input signal to the readout circuit of the CMOS imaging sensor.

In some embodiments, at least one computer-readable storage medium having computer-executable instructions embodied thereon, wherein, when executed by at least one processor, the computer-executable instructions cause the at least one processor to perform a frequency domain noise simulation for a readout circuit of the CMOS image sensor, wherein the readout circuit includes a CDS circuit for noise reduction, the frequency domain noise simulation including a CDS transfer function in the frequency domain noise simulation to refer a noise introduced by the CDS circuit back to an input node of the readout circuit, calculate noise at the input node of the readout circuit based on the referred back noises caused by one or more components in the readout circuit, and estimate noise of the CMOS imaging sensor by comparing the calculated noise at the input node of the readout circuit to an original input signal to the readout circuit of the CMOS imaging sensor.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for noise simulation of a CMOS image sensor, comprising:
   performing a frequency domain noise simulation for a readout circuit of the CMOS image sensor using a computer, wherein the readout circuit includes a correlated double sampling (CDS) circuit, wherein the frequency domain noise simulation includes a CDS transfer function to refer a noise introduced by the CDS circuit back to an input node of the readout circuit;
   calculating noise at the input node of the readout circuit based on the referred back noises caused by one or more components in the readout circuit; and
   estimating noise of the CMOS imaging sensor by comparing the calculated noise at the input node of the readout circuit to an original input signal to the readout circuit of the CMOS imaging sensor.

2. The method of claim 1, wherein:
   the CDS transfer function reflects an input-output relationship of the CDS circuit in the frequency domain.

3. The method of claim 1, wherein:
   the readout circuit of the CMOS image sensor receives, processes, and outputs an electrical signal from a selected pixel in a pixel array of the CMOS image sensor.

4. The method of claim 3, wherein:
   the CDS circuit samples the electrical signal from the pixel twice at different point in time for noise reduction.

5. The method of claim 3, wherein:
   the readout circuit of the CMOS image sensor further includes a column amplifier and an analog-to-digital convertor (ADC).

6. The method of claim 5, wherein:
   the column amplifier amplifies the electrical signal from the selected pixel before providing it to the CDS circuit for processing.

7. The method of claim 5, further comprising:
   referring noises introduced by one or more of the CDS circuit and the ADC back to the input node of the readout circuit.

8. The method of claim 3, wherein:
   the readout circuit of the CMOS image sensor further includes a programmable gain amplifier (PGA) and an analog-to-digital convertor (ADC).

9. The method of claim 8, wherein:
   the PGA amplifies the electrical signal after it has been processed by the CDS circuit.

10. The method of claim 8, further comprising:
    referring noises introduced by one or more of the CDS circuit, PGA, or the ADC back to the input node of the readout circuit.

11. A system for performing noise simulation of a CMOS image sensor, comprising:

a computing device programmed with executable instructions that, when executed:
  perform a frequency domain noise simulation for a readout circuit of the CMOS image sensor, wherein the readout circuit includes a correlated double sampling (CDS) circuit for noise reduction, the frequency domain noise simulation including a CDS transfer function in the frequency domain noise simulation to refer a noise introduced by the CDS circuit back to an input node of the readout circuit;
  calculate noise at the input node of the readout circuit based on the referred back noises caused by one or more components in the readout circuit; and
  estimate noise of the CMOS imaging sensor by comparing the calculated noise at the input node of the readout circuit to an original input signal to the readout circuit of the CMOS imaging sensor.

12. The system of claim 11, wherein:
the CDS transfer function reflects an input-output relationship of the CDS circuit in the frequency domain.

13. The system of claim 11, wherein:
the readout circuit of the CMOS image sensor is configured to receive, process, and output an electrical signal from a selected pixel in a pixel array of the CMOS image sensor.

14. The system of claim 13, wherein:
the readout circuit of the CMOS image sensor further includes a column amplifier and an analog-to-digital convertor (ADC).

15. The system of claim 14, wherein:
the column amplifier is configured to amplify the electrical signal from the selected pixel before providing it to the CDS circuit for processing.

16. The system of claim 14, wherein:
the computing device is programmed with executable instructions that, when executed, refer noises introduced by one or more of the CDS circuit or the ADC back to the input node of the readout circuit.

17. The system of claim 13, wherein:
the readout circuit of the CMOS image sensor further includes a programmable gain amplifier (PGA) and an analog-to-digital convertor (ADC).

18. The system of claim 17, wherein:
the PGA is configured to amplify the electrical signal after it has been processed by the CDS circuit.

19. The system of claim 17, wherein:
the computing device is programmed with executable instructions that, when executed, refer noises introduced by one or more of the CDS circuit, PGA, and the ADC back to the input node of the readout circuit.

20. At least one non-transitory computer-readable storage medium having computer-executable instructions embodied thereon, wherein, when executed by at least one processor, the computer-executable instructions cause the at least one processor to:
  perform a frequency domain noise simulation for a readout circuit of the CMOS image sensor, wherein the readout circuit includes a CDS circuit for noise reduction, the frequency domain noise simulation including a CDS transfer function in the frequency domain noise simulation to refer a noise introduced by the CDS circuit back to an input node of the readout circuit;
  calculate noise at the input node of the readout circuit based on the referred back noises caused by one or more components in the readout circuit; and
  estimate noise of the CMOS imaging sensor by comparing the calculated noise at the input node of the readout circuit to an original input signal to the readout circuit of the CMOS imaging sensor.

* * * * *